US012759614B2

(12) United States Patent
Harris et al.

(10) Patent No.: US 12,759,614 B2
(45) Date of Patent: Oct. 13, 2026

(54) STEER-BY-WIRE ROAD WHEEL ACTUATOR BALL SCREW ANTI-ROTATION MECHANISM

(71) Applicant: Steering Solutions IP Holding Corporation, Saginaw, MI (US)

(72) Inventors: Ryan D. Harris, Clio, MI (US); Trent E. Konwinski, Linwood, MI (US); Christopher R. Case Myers, Freeland, MI (US); Eric D. Pattok, Frankenmuth, MI (US); Travis L. Palmer, Frankenmuth, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 417 days.

(21) Appl. No.: 18/458,217

(22) Filed: Aug. 30, 2023

(65) Prior Publication Data

US 2024/0067256 A1 Feb. 29, 2024

Related U.S. Application Data

(60) Provisional application No. 63/402,325, filed on Aug. 30, 2022.

(51) Int. Cl.
*B62D 5/00* (2006.01)
*B62D 5/04* (2006.01)

(52) U.S. Cl.
CPC ........... *B62D 5/001* (2013.01); *B62D 5/0448* (2013.01)

(58) Field of Classification Search
CPC ........ B62D 5/001; B62D 5/0448; B62D 5/04; B62D 5/0445; B62D 3/123; F16H 55/26;
(Continued)

(56) References Cited

U.S. PATENT DOCUMENTS

2002/0124670 A1 9/2002 Bugosh
2021/0394818 A1 12/2021 Zinnecker et al.

FOREIGN PATENT DOCUMENTS

CN 103010804 A 4/2013
CN 107031700 A 8/2017
(Continued)

OTHER PUBLICATIONS

Espace translation of DE 10 2017 103975 A1 (Year: 2018).*
(Continued)

*Primary Examiner* — Vivek D Koppikar
*Assistant Examiner* — Scott Lawrence Strickler
(74) *Attorney, Agent, or Firm* — Dickinson Wright PLLC

(57) ABSTRACT

A steer-by-wire steering system for a vehicle includes a rack moveable in an axial direction. The steer-by-wire steering system also includes an anti-rotation mechanism disposed proximate an outer surface of the rack at the mounting location of the rack. The anti-rotation mechanism includes a yoke having a bearing journal extending therefrom. The anti-rotation mechanism also includes a bearing disposed on the bearing journal of the yoke. The anti-rotation mechanism further includes a running plate structure disposed within a rack housing and extending in a longitudinal direction of the rack, wherein the bearing and the yoke are positioned to move along a surface of the running plate structure during movement of the rack in the axial direction.

18 Claims, 6 Drawing Sheets

(58) Field of Classification Search
CPC .. F16H 55/28; F16H 55/283; F16H 2025/204; F16H 2019/046; F16C 2326/24; F16C 29/002; F16C 29/02
See application file for complete search history.

(56) References Cited

FOREIGN PATENT DOCUMENTS

| | | | | |
|---|---|---|---|---|
| CN | 207389292 U | | 5/2018 | |
| CN | 109311507 A | | 2/2019 | |
| CN | 109969253 A | | 7/2019 | |
| CN | 110712181 A | | 1/2020 | |
| DE | 102017103975 A1 | * | 8/2018 | ........... B62D 5/0448 |
| DE | 102020102212 A1 | * | 8/2021 | ........... B62D 5/0445 |
| WO | 03011674 A1 | | 2/2003 | |

OTHER PUBLICATIONS

Espace translation of DE 10 2020 102 212 A1 (Year: 2021).*
Search Report for First Office Action regarding corresponding CN App. No. 202311356389.9; dated Jun. 30, 2026.
First Office Action regarding corresponding CN App. No. 202311128465.0; dated Apr. 13, 2026.

* cited by examiner

STEER-BY-WIRE ROAD WHEEL ACTUATOR BALL SCREW ANTI-ROTATION MECHANISM

CROSS-REFERENCE TO RELATED APPLICATION

This application claims the benefits of priority to U.S. Provisional Patent Application Ser. No. 63/402,325, filed Aug. 30, 2022, the disclosure of which is incorporated by reference herein in its entirety.

FIELD OF THE INVENTION

The subject matter disclosed herein relates to electric power steering (EPS) systems and, more particularly, to a road wheel actuator anti-rotation mechanism for such EPS systems electric power steering (EPS) systems.

BACKGROUND

Various electric power steering (EPS) systems have been developed for assisting an operator with vehicle steering. One type of EPS system is referred to as a rack electric power steering (REPS) system. Some examples of steer-by-wire (SbW) road wheel actuators (RWAs) are simply ball screw based rack electric power steering systems without input shafts. In this configuration, a pinion gear shaft still engages rack teeth cut into the ball screw rack bar. This gear mesh provides two primary functions. First, the pinion gear is a convenient rotating member for ball screw position sensing is provided. Second, the pinion gear serves as an anti-rotation feature to prevent spinning of the ball screw. If a steer-by-wire road wheel actuator is designed for a large vehicle, it may require the use of two ball nuts on the same ball screw to achieve the required output force. Since the center of the ball circuits in each ball nut defines the axis of the ball screw, the addition of a rack and pinion mesh to this type of system would lead to an over-constraint condition. The over-constraint is undesirable since it will lead to friction variation if parts are out of alignment.

SUMMARY OF THE DISCLOSURE

According to one aspect of the disclosure, a steer-by-wire steering system for a vehicle includes a rack moveable in an axial direction. The steer-by-wire steering system also includes an anti-rotation mechanism disposed proximate an outer surface of the rack at the mounting location of the rack. The anti-rotation mechanism includes a yoke having a bearing journal extending therefrom. The anti-rotation mechanism also includes a bearing disposed on the bearing journal of the yoke. The anti-rotation mechanism further includes a running plate structure disposed within a rack housing and extending in a longitudinal direction of the rack, wherein the bearing and the yoke are positioned to move along a surface of the running plate structure during movement of the rack in the axial direction.

According to another aspect of the disclosure, a steer-by-wire steering system for a vehicle includes a rack moveable in an axial direction. The steer-by-wire steering system also includes an anti-rotation mechanism disposed proximate an outer surface of the rack at the mounting location of the rack. The anti-rotation mechanism includes a yoke having a bearing journal extending therefrom. The anti-rotation mechanism also includes a bearing disposed on the bearing journal of the yoke. The anti-rotation mechanism further includes a running plate structure disposed within a rack housing and extending in a longitudinal direction of the rack, wherein the bearing is positioned to move along a surface of the running plate structure during movement of the rack in the axial direction. The running plate structure includes a first plate segment. The running plate structure also includes a second plate segment. The running plate structure also includes an end segment connecting the first plate segment and the second plate segment. The anti-rotation mechanism also includes a biasing member in contact with the yoke. The anti-rotation mechanism further includes a slider to apply a torque on the yoke during operation.

These and other advantages and features will become apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, the embodiments described herein are used in conjunction with a steering assembly of a vehicle, such as a car, truck, sport utility vehicle, crossover, mini-van, marine craft, aircraft, all-terrain vehicle, recreational vehicle, or other suitable vehicles. As discussed herein, an electric power steering (EPS) system, including a steer-by-wire system, for example, includes an anti-rotation mechanism where a pinion is not used in the steering system. The anti-rotation mechanism resists rotation of a ball screw, lead screw, rack or the like. Such rotation is induced by the loading of the threading of one or more ball nuts or lead nuts.

As used herein, the terms screw, ball screw, and rack define a longitudinal member which is translated upon rotation of another member, such as a ball nut, for example. It is to be understood that the components may be used in various embodiments of the disclosure and are not limiting of other components which may be translated to carry out steering maneuvers.

Figure 1:
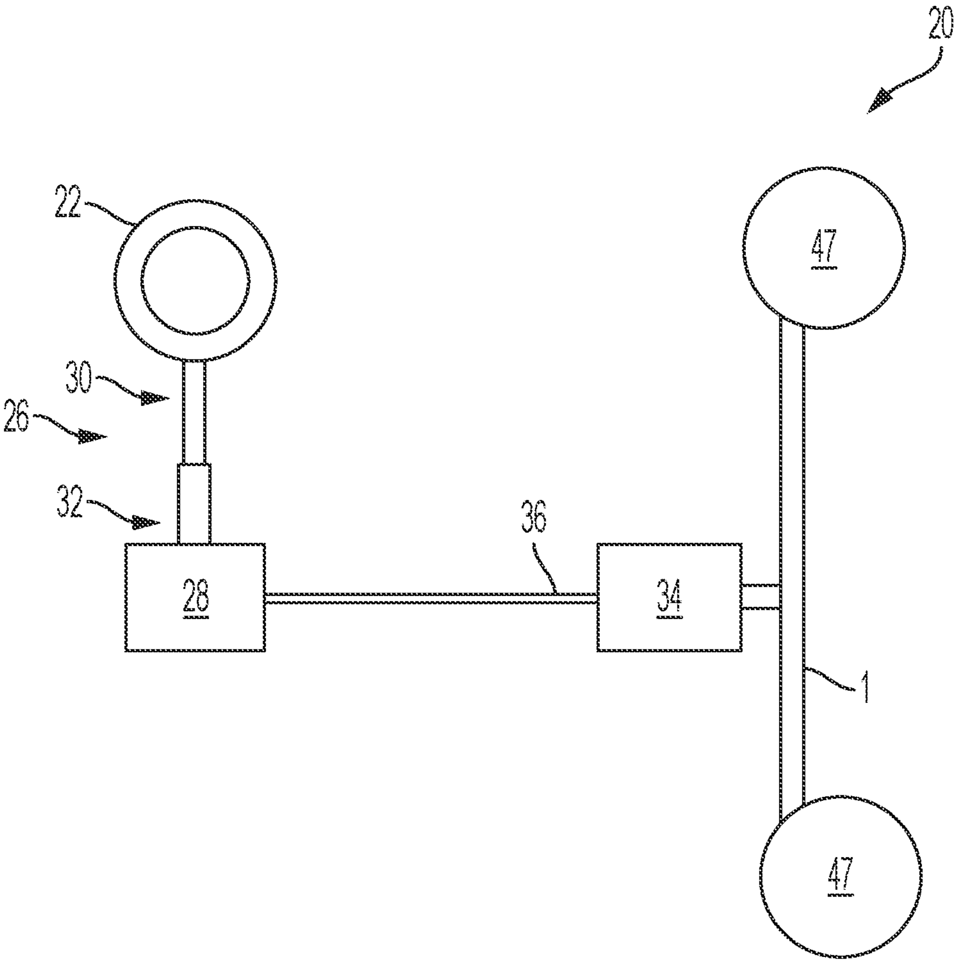
FIG. 1 illustrates a steering assembly with a rack electric power steering system.

Referring initially to FIG. 1, a power steering system 20 is generally illustrated schematically. The power steering system 20 may be configured as a driver interface steering system, an autonomous driving system, or a system that allows for both driver interface and autonomous steering. The steering system 20 may include an input device 22, such as a steering wheel, wherein a driver may mechanically provide a steering input by turning the steering wheel. A steering column 26 extends along an axis from the input device 22 to an output assembly 28. The steering column 26 may include two or more axially and/or rake adjustable parts, such as a first portion 30 and a second portion 32 which are axially adjustable with respect to one another. However, only a single portion may be present in some embodiments. The embodiments disclosed herein are utilized in steering systems where the output assembly 28 is in operative communication with an actuator 34 that is coupled to a rack, such as a ball screw rack 1, having a helical screw/linear rack configuration. The output assembly 28 is in operative communication, such as wired communication 36 (e.g., steer-by-wire configuration) with the actuator 34. Translation of the rack 1 adjusts the road wheels 47 for steering maneuvers.

Figure 2:
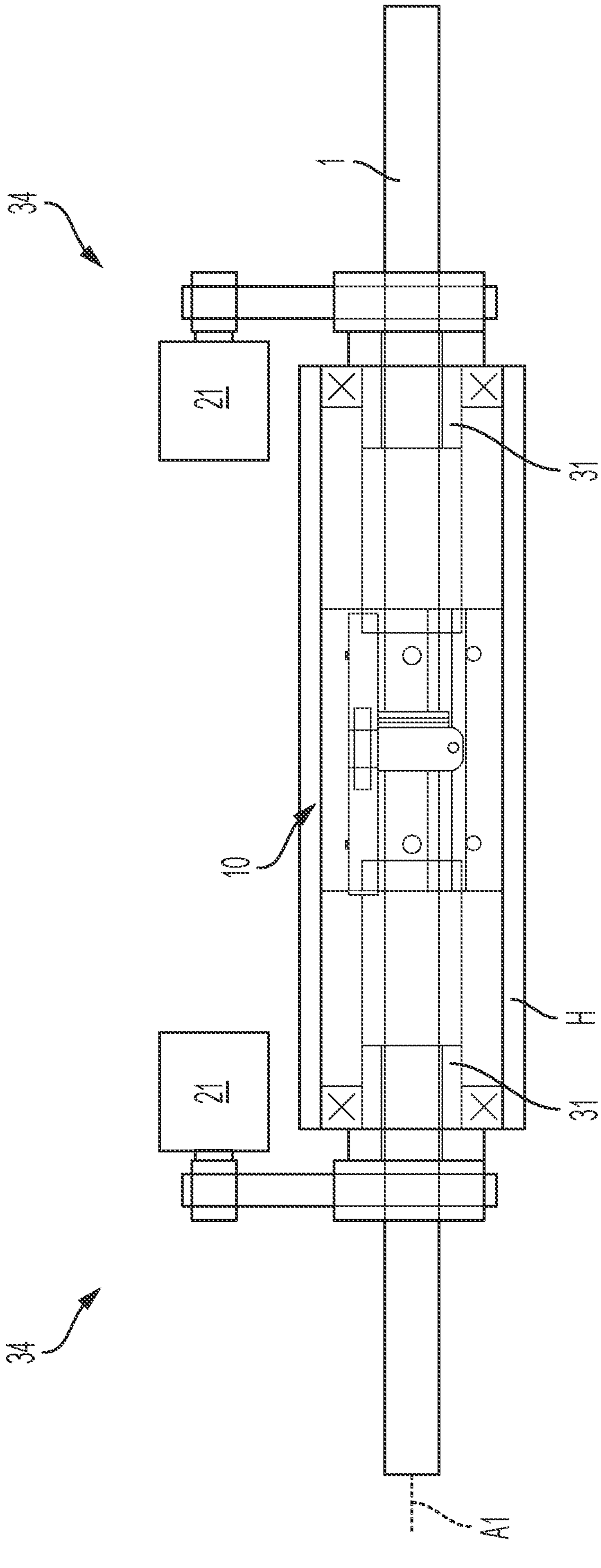
FIG. 2 schematically illustrates a dual motor embodiment of the rack electric power steering system.

As illustrated in FIG. 2, the rack 1 is translated with at least one actuator, and possibly two or more actuators 34, by way of example and without limitation. Each actuator 34 includes a motor 21 and a ball nut 31 configured to drive the rack 1 for translation along a rack axis A1. The rack 1 is at least partially surrounded radially by a housing, referenced with H. An anti-rotation mechanism 10 is disposed within a bore of the housing H and is described herein.

Figure 3:
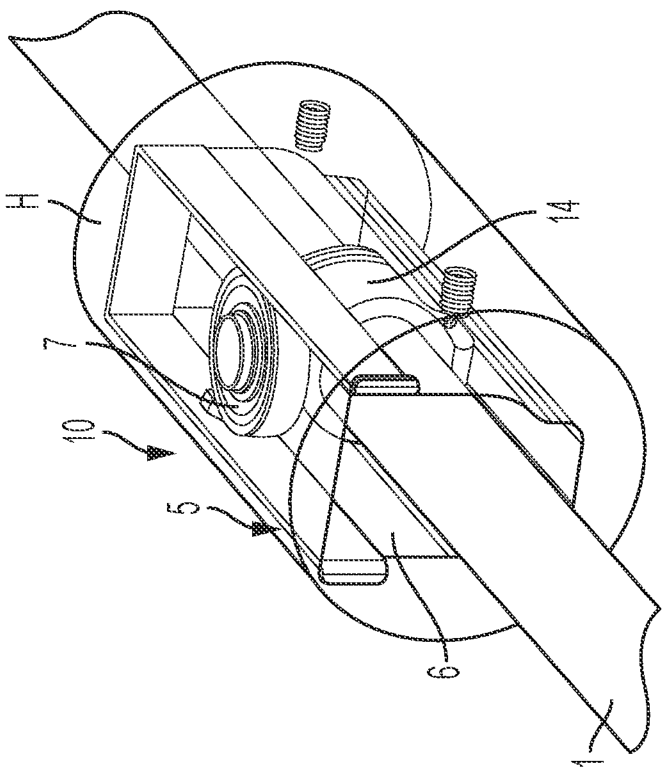
FIG. 3 is a perspective view of an anti-rotation mechanism for the rack electric power steering system disposed within a housing.

Referring now to FIG. 3, the rack 1 and the anti-rotation mechanism 10 for the rack 1 are shown disposed within the housing H. The anti-rotation mechanism 10 resists rotation of the rack 1 during operation, as disclosed herein.

Figure 4:
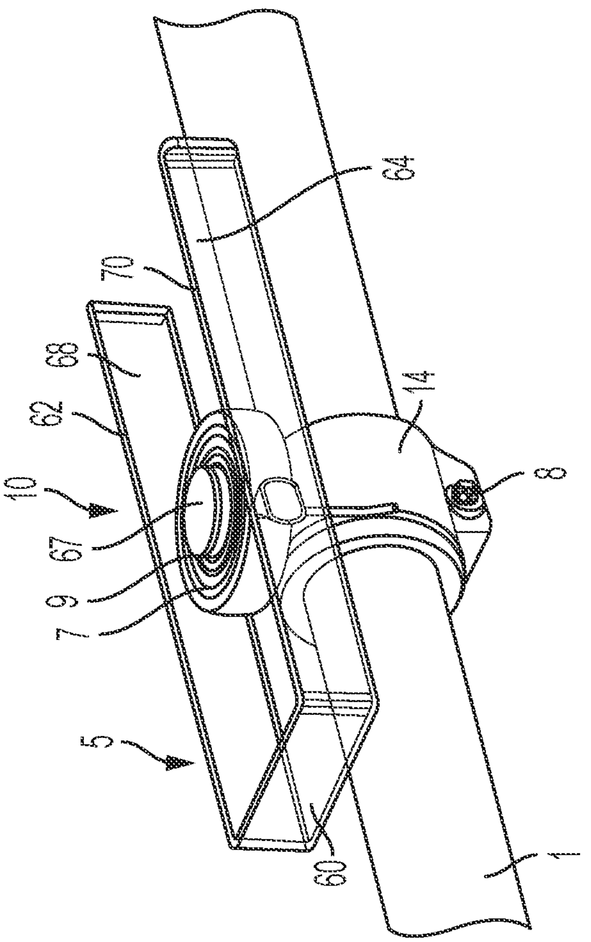
FIG. 4 is a perspective view of the anti-rotation mechanism.

The anti-rotation mechanism 10 is illustrated within a bore 6 defined by the housing H in FIG. 3 and with the housing H removed in FIG. 4 to better illustrate various aspects of the anti-rotation mechanism 10. Referring to FIGS. 3 and 4, the anti-rotation mechanism 10 includes a yoke 14 surrounding the rack 1, with a bearing 7 attached to the yoke 14. The bearing 7 is positioned between a running plate structure 5. The running plate structure 5 is disposed within the bore 6 of the housing H, and in abutment with the walls defining the bore 6.

The yoke 14 defines a yoke bore with a yoke bore surface 15. The yoke bore surface 15 is smooth in some embodiments. In other embodiments, the yoke bore surface 15 is textured, for example, with a knurl to increase the friction at an interface with the rack 1. The yoke 14 includes a break 16 to allow for enough deflection to clamp the yoke 14 on the outer surface of the rack 1, as shown more clearly in FIGS. 5 and 6. The yoke 14 is positioned along the rack 1 between the two ball nuts 31. In some embodiments, the yoke 14 is located at a central axial location of the rack 1, such as approximately at a mid-point of the rack 1 in the axial direction of the rack 1. The yoke 14 is located on the rack 1 with a pinch bolt 8—or any other suitable fastener mechanism to provide a clamp force sufficient to fittingly retain the yoke 14 to the rack 1.

Figure 8:
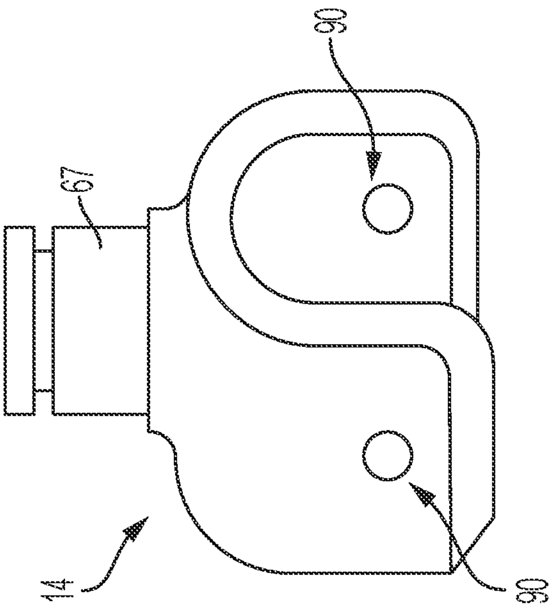
FIG. 8 is a perspective view of the yoke of the anti-rotation mechanism.
Figure 7:
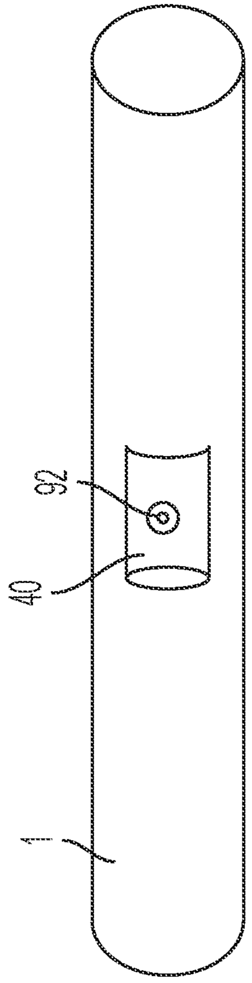
FIG. 7 is a perspective view of a ball screw having a mounting structure for a yoke of the anti-rotation mechanism.
Figure 10:
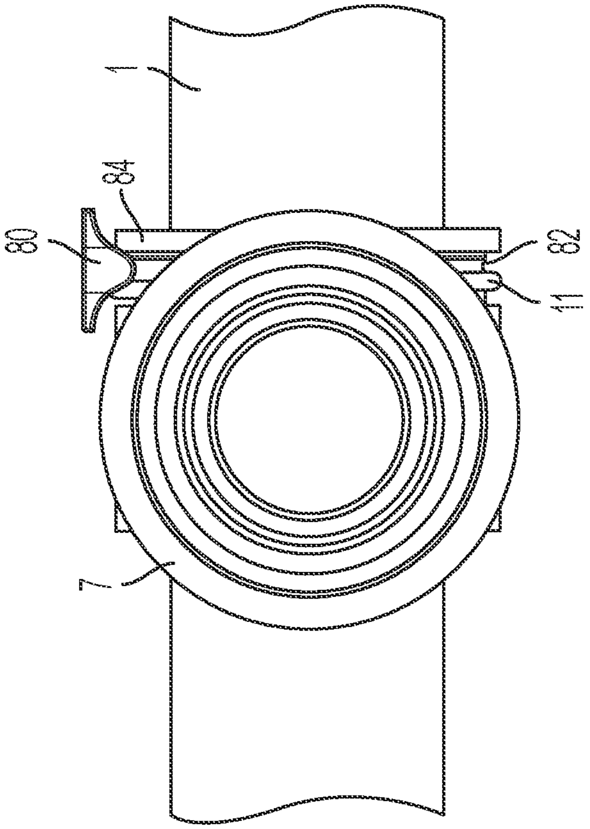
FIG. 10 is a top view of the anti-rotation mechanism.
Figure 9:
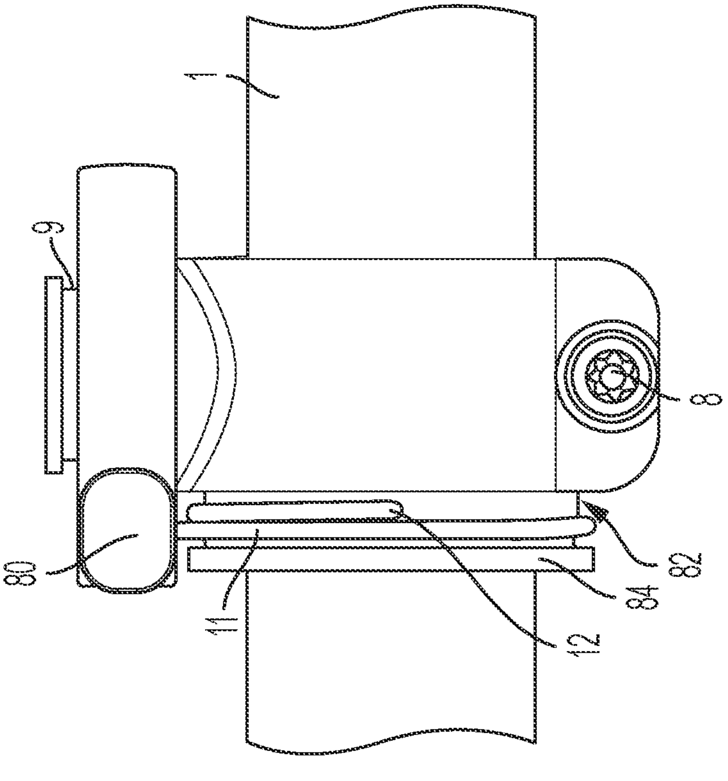
FIG. 9 is a side, elevation view of the anti-rotation mechanism.

As shown in FIGS. 7 and 8, the rack 1 may have one or more recessed regions 40 to receive the yoke 14. The recessed region(s) 40 may be any suitable geometry configured to receive the yoke 14 in a desired position. For example, machined flats may be provided on each side of the rack 1. The yoke 14 includes a pair of holes 90 which align with holes 92 defined by the rack 1 to allow the pinch bolt 8 to clamp the yoke 14 to the rack 1. The connection of the yoke 14 to the rack 1 ensures that the yoke 14 translates in the axial direction of the rack 1 with the rack 1. The connection between the yoke 14 and the rack 1 also prevents the yoke 14 from spinning relative to the rack 1.

Referring now to FIGS. 3 and 4, as described above, the running plate structure 5 is positioned in the housing bore 6. The running plate structure 5 is a single, integrally formed component as shown. In the illustrated embodiment, the running plate structure 5 is a substantially U-shaped component having an end segment 60, a first plate segment 62 and a second plate segment 64. In the illustrated embodiment, the first plate segment 62 and the second plate segment 64 are substantially parallel to each other and substantially perpendicular to the end segment 60. Each plate segment 62, 64 has an inner running plate surface, specifically a first inner running plate surface 68 for the first plate segment 62 and a second inner running plate surface 70 for the second plate segment 64. The running plate structure 5 is fixed within the housing bore 6 in any suitable manner and is in abutment with the housing H. Although shown and described as a single component formed in a substantially U-shape, it is to be understood that two separate components could be positioned relative to each other in the same manner as the first plate segment 62 and the second plate segment 64 in other embodiments.

The bearing 7, which is attached to the yoke 14, is positioned between the first plate segment 62 and the second plate segment 64. The bearing 7 is configured to react against the running plate structure 5 during operation. The bearing 7 is pressed onto a journal 67 on the yoke 14 with a retaining ring or the like (not shown) positioned next to the bearing 7 in a retaining ring groove 9. In some embodiments, the retaining ring is not needed and the press load associated with pressing the bearing 7 onto the journal 67 is sufficient to hold the bearing 7 to the yoke 14. The distance between the first inner running plate surface 68 and the second inner running plate surface 70 is slightly larger than an outer diameter of the bearing 7, such that the bearing 7 will only contact and thus roll against one side of the steel running 5 surface at a time, i.e. one of the inner running plate surfaces 68, 70. The outer ring of the bearing 7 has a curved profile (e.g., spherical) which results in a point contact on one of the inner running plate surfaces 68. 70.

Figure 6:
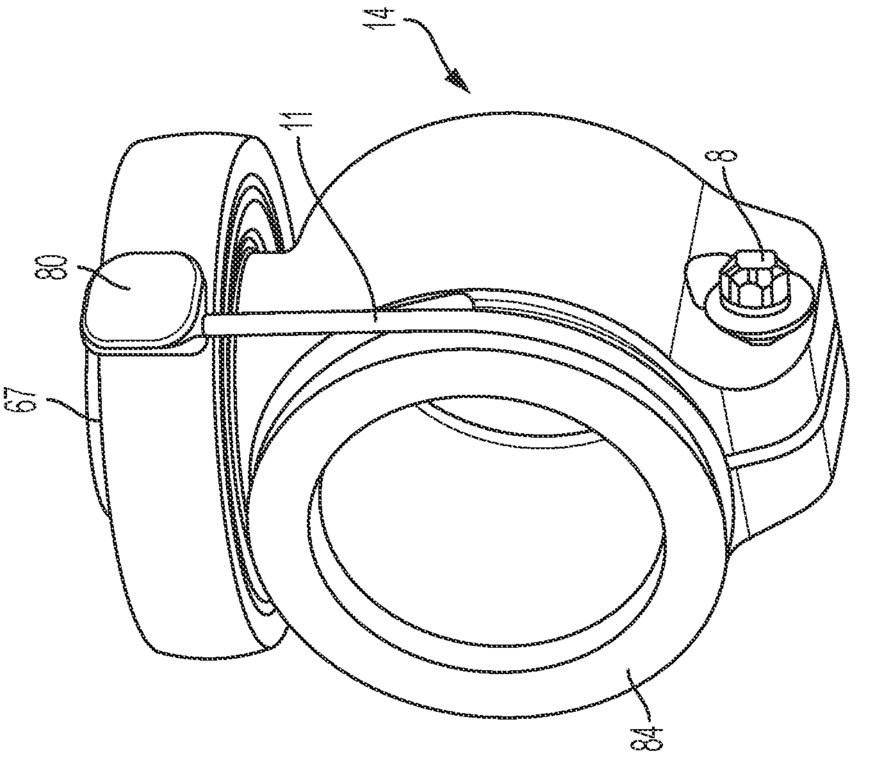
FIG. 6 is a second perspective view of a portion of the anti-rotation mechanism.
Figure 5:
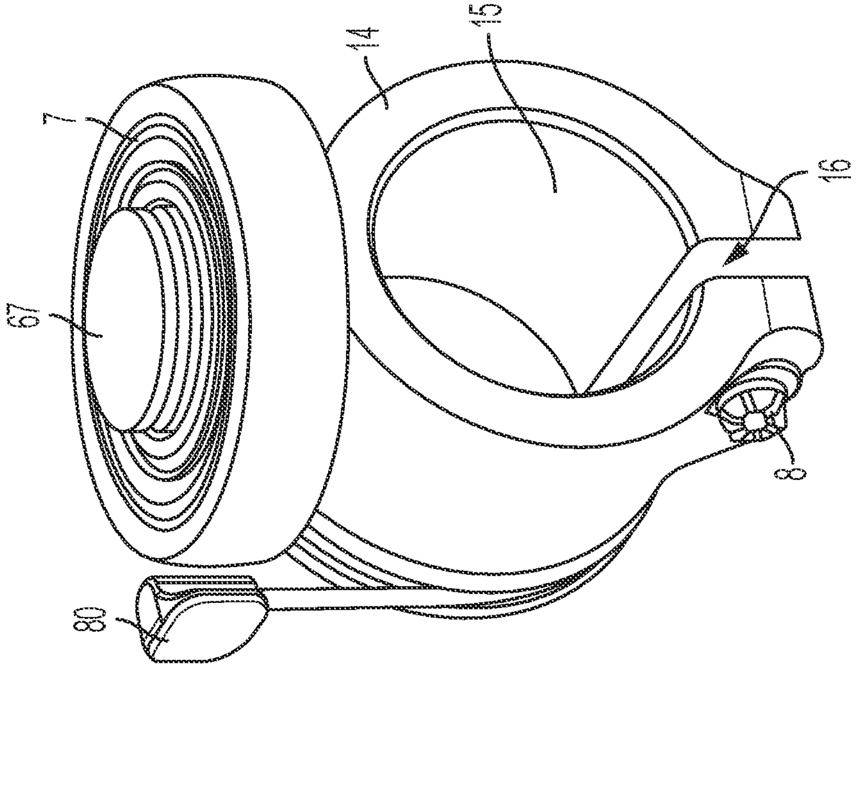
FIG. 5 is a first perspective view of a portion of the anti-rotation mechanism.

A biasing member 11, in combination with a slider 80, work to apply a torque to the yoke 14. The biasing member 11 is positioned within a groove 82 defined by an axially extending portion 84 of the yoke 14. The biasing member 11 may be any type of resilient member capable of retaining the slider 80 in a desired position, to which an end of the biasing member 11 is operatively coupled, as shown in FIGS. 5 and 6. In operation, when there is little to no torque on the rack 1 from the ball nuts 31, the torque from the biasing member 11 forces the bearing 7 to maintain contact with one side of the running plate structure 5, i.e. one of the inner running plate surfaces 68, 70. When a large torque is applied to the rack 1 by the ball nuts 31, the preload from the biasing member 11 is overcome and the bearing 7 will rotate with the yoke 14 until it makes contact with the other side of the running plate structure 5, i.e. the other of the inner running plate surfaces 68, 70. The biasing member 11 and the slider 80 are meant to prevent noise when road forces or driver inputs cause the torque on the rack 1 to reverse. The groove 82 on the yoke 14 at least partially guides the biasing member 11 and a retention hole 12 locates the end of the biasing member 11 by fixing the end therein.

The slider 80 is formed of a material having a coefficient of friction lower than the coefficient of friction of the running plate structure 5 in some embodiments. By way of non-limiting example, the slider 80 may be formed of plastic, but other materials are contemplated. This allows the slider 80, and therefore the bearing 7 and yoke 14, to move along the running plate structure 5 with little to no significant resistance.

The vertical walls of the inner running plate surfaces 68, 70 allow the yoke 14 and thus the rack 1 to float radially in the direction of the bearing 7 axis. The curved profile of the bearing 7 outer surface allows the rack 1 to shift side-to-side without generating a side load on the rack 1 due to such displacement. The disclosed embodiments allow for a reaction force between the bearing 7 and the running plate structure 5 to counteract any torque applied to the rack 1 by the ball nuts 31 while not over-constraining the position of the rack 1.

The embodiments disclosed herein provides several structural features and benefits, including, but not limited to: 1) a yoke and bearing mechanism that clamps onto the surface of the ball screw via a pinch bolt; 2) torque applied to the ball screw by the ball nuts is transferred to the yoke via friction; 3) reaction force is generated at the outer surface of the bearing against the running surface that reacts the ball screw torque; 4) biasing member with a plastic slider forces the bearing to run against one side of the running surface when the ball screw torque is low and prevents reversal noise; 5) the vertical walls of the running surface allow the ball screw to move along the axis of the bearing with no resistance; 6) the spherical profile of the bearing outer ring running on the flat running surfaces allows the ball screw to move side-to-side without generating a side load on the ball screw; and 7) mechanism prevents the over constraint of the ball screw axis.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A steer-by-wire steering system for a vehicle comprising:
- a rack moveable in an axial direction; and
- an anti-rotation mechanism disposed proximate an outer surface of the rack at the mounting location of the rack, the anti-rotation mechanism comprising:
  - a yoke having a bearing journal extending therefrom;
  - a bearing disposed on the bearing journal of the yoke;
  - a running plate structure disposed within a rack housing and extending in a longitudinal direction of the rack, wherein the bearing and the yoke are positioned to move along a surface of the running plate structure during movement of the rack in the axial direction;
  - a biasing member in contact with the yoke;
  - a slider operatively coupled to the biasing member, the slider a being distinct, separate component from the bearing, wherein the biasing member and the slider apply a torque to the yoke during operation, wherein the slider is formed of a material having a coefficient of friction lower than the coefficient of friction of the running plate structure.

2. The steer-by-wire steering system of claim 1, wherein the running plate structure comprises:
- a first plate segment;
- a second plate segment; and
- an end segment connecting the first plate segment and the second plate segment.

3. The steer-by-wire steering system of claim 2, wherein the first plate segment and the second plate segment are parallel to each other to form a U-shaped component.

4. The steer-by-wire steering system of claim 3, wherein the first plate segment has a first inner running plate surface, wherein the second plate segment has a second inner running plate surface, wherein a distance between the first inner running plate surface and the second inner running plate surface is greater than an outer diameter of the bearing, wherein the outer diameter of the bearing includes a curved surface in contact with the running plate structure.

5. The steer-by-wire steering system of claim 1, wherein the running plate structure is an integrally formed component.

6. The steer-by-wire steering system of claim 1, wherein the rack is axially driven by a rotating ball nut.

7. The steer-by-wire steering system of claim 1, wherein the rack is axially driven by a pair of rotating ball nuts.

8. The steer-by-wire steering system of claim 7, wherein the anti-rotation mechanism is located on the rack between the pair of rotating ball nuts.

9. The steer-by-wire steering system of claim 1, wherein the biasing member is positioned within a groove defined by an axially extending portion of the yoke.

10. The steer-by-wire steering system of claim 9, wherein the axially extending portion of the yoke defines a retention hole to locate and fix an end of the biasing member, wherein the yoke is clamped to the rack with a mechanical fastener.

11. A steer-by-wire steering system for a vehicle comprising:
- a rack moveable in an axial direction; and
- an anti-rotation mechanism disposed proximate an outer surface of the rack at the mounting location of the rack, the anti-rotation mechanism comprising:
  - a yoke having a bearing journal extending therefrom;
  - a bearing disposed on the bearing journal of the yoke; and
  - a running plate structure disposed within a rack housing and extending in a longitudinal direction of the rack, wherein the bearing is positioned to move along a surface of the running plate structure during movement of the rack in the axial direction, wherein the running plate structure comprises:
    - a first plate segment;
    - a second plate segment; and
    - an end segment connecting the first plate segment and the second plate segment;
  - a biasing member in contact with the yoke; and
  - a slider operatively coupled to the biasing member, the slider a being distinct, separate component from the bearing, wherein the biasing member and the slider apply a torque on the yoke during operation, wherein the slider is formed of a material having a coefficient of friction lower than the coefficient of friction of the running plate structure.

12. The steer-by-wire steering system of claim 11, wherein the first plate segment has a first inner running plate surface, wherein the second plate segment has a second inner running plate surface, wherein a distance between the first inner running plate surface and the second inner running plate surface is greater than an outer diameter of the bearing.

13. The steer-by-wire steering system of claim 11, wherein the running plate structure is an integrally formed component.

14. The steer-by-wire steering system of claim 11, wherein the rack is axially driven by a rotating ball nut.

15. The steer-by-wire steering system of claim 11, wherein the rack is axially driven by a pair of rotating ball nuts.

16. The steer-by-wire steering system of claim 15, wherein the anti-rotation mechanism is located on the rack between the pair of rotating ball nuts.

17. The steer-by-wire steering system of claim 11, wherein the biasing member is positioned within a groove defined by an axially extending portion of the yoke.

18. The steer-by-wire steering system of claim 17, wherein the axially extending portion of the yoke defines a retention hole to locate and fix an end of the biasing member.

* * * * *